(12) United States Patent
Gilgrass et al.

(10) Patent No.: US 8,154,830 B2
(45) Date of Patent: Apr. 10, 2012

(54) APPARATUS FOR QUENCH PROTECTION AND STABILIZING DECAY IN A QUASI-PERSISTENT SUPERCONDUCTING MAGNET

(75) Inventors: Graham Gilgrass, Wallingford (GB); M'Hamed Lakrimi, Oxford (GB); Adrian Mark Thomas, Bicester (GB)

(73) Assignee: Siemens plc, Frimley, Camberley (GB)

( * ) Notice: Subject to any disclaimer, the term of this patent is extended or adjusted under 35 U.S.C. 154(b) by 181 days.

(21) Appl. No.: 12/525,025

(22) PCT Filed: Feb. 29, 2008

(86) PCT No.: PCT/GB2008/050142
§ 371 (c)(1), (2), (4) Date: Jul. 29, 2009

(87) PCT Pub. No.: WO2008/120007
PCT Pub. Date: Oct. 9, 2008

(65) Prior Publication Data
US 2010/0073115 A1    Mar. 25, 2010

(30) Foreign Application Priority Data

Apr. 2, 2007  (GB) ................. 0706399.3
May 23, 2007  (GB) ................. 0709875.9

(51) Int. Cl.
*H02H 7/00* (2006.01)
(52) U.S. Cl. ............... 361/19; 361/58; 361/9
(58) Field of Classification Search ............ 361/19, 361/58, 54, 93.9, 8, 9, 10
See application file for complete search history.

(56) References Cited

U.S. PATENT DOCUMENTS

| | | | |
|---|---|---|---|
| 3,703,664 A * | 11/1972 | Cronin | 361/58 |
| 7,400,223 B2 * | 7/2008 | Spreiter et al. | 335/216 |
| 7,440,244 B2 * | 10/2008 | Yuan et al. | 361/19 |
| 7,630,179 B2 * | 12/2009 | Umans | 361/19 |
| 2003/0057942 A1 * | 3/2003 | Biltcliffe et al. | 324/200 |
| 2004/0264072 A1 | 12/2004 | Yuan | |
| 2006/0072254 A1 * | 4/2006 | Sargent et al. | 361/19 |
| 2006/0250204 A1 | 11/2006 | Spreiter et al. | |
| 2007/0024404 A1 | 2/2007 | Westphal et al. | |
| 2007/0127171 A1 * | 6/2007 | Lee et al. | 361/19 |
| 2007/0263328 A1 * | 11/2007 | Jonas et al. | 361/19 |
| 2009/0086386 A1 * | 4/2009 | Sargent et al. | 361/19 |

FOREIGN PATENT DOCUMENTS

| | | |
|---|---|---|
| CA | 2 070 322 C | 12/1992 |
| GB | 2 429 293 A | 2/2007 |
| JP | 3-11706 A | 1/1991 |
| JP | 3-272107 A | 12/1991 |
| JP | 5-68328 A | 3/1993 |

OTHER PUBLICATIONS

Translation of Chinese Office Action dated May 16, 2011 (four (4) pages). International Search Report dated May 26, 2008 (three (3) pages).
Great Britain Search Report dated Aug. 31, 2007 (one (1) page).
Form PCT/IPEA/416 (one (1) page); Form PCT/IPEA/409 (five (5) pages); amended sheets (two (2) pages); totaling (eight (8) pages).
Great Britain Office Action dated May 5, 2009 (two (2) pages).
Form PCT/ISA/237 (six (6) pages).

* cited by examiner

*Primary Examiner* — Patrick Salce
(74) *Attorney, Agent, or Firm* — Crowell & Moring LLP

(57) ABSTRACT

A superconducting magnet assembly comprises a superconducting magnet which, under working conditions, generates a magnetic field in a working volume. The superconducting magnet is connected in parallel with a series combination of a superconducting fault current limiter and a resistor, and with a DC power source. Under working conditions, the magnet can be energized by the power source to generate a desired magnetic field in the working volume.

5 Claims, 2 Drawing Sheets

Prior Art

APPARATUS FOR QUENCH PROTECTION AND STABILIZING DECAY IN A QUASI-PERSISTENT SUPERCONDUCTING MAGNET

The present invention relates to the stabilization of the decay of a superconducting magnet operated in a quasi-persistent mode and to quench protection of such a magnet.

BACKGROUND

A typical superconducting magnet system consists of main magnet coils which generate a desired magnetic field intensity, and a superconducting switch mounted in parallel with the coils to enable persistent mode of operation.

Superconducting magnets are normally run in persistent mode, in which current is introduced from a power supply through current leads into superconducting coils using a ramp-up procedure during which the switch is opened. The superconducting switch is then closed and the current remains flowing in the superconducting coils for a relatively long time. A steady magnetic field is thereby produced. However, it is not necessary to keep the magnet powered continuously by the current power supply. The magnet is put in persistent mode by closing the superconducting switch thus enabling the current to circulate in a continuous superconducting loop formed by the magnet and the switch, and by running the current in the leads down to zero.

After running the current in the current leads down to zero, the current leads are then typically completely removed. Consequently, the current is allowed to continuously circulate in the superconducting loop formed by the magnet and the switch. As is known in such conventional persistent mode magnets, the current drifts with time and the magnet will be characterised by a decay performance which depends largely on the resistance of the superconducting joints. For a decaying magnet, a stabilization solution by means of a resistor circuit in conjunction with a superconducting switch as described in United States patent application US20030057942 has been developed and successfully implemented on superconducting magnets. The resistor stabilization solution in conjunction with a switch described in that patent application applies particularly to magnets which are protected in sections, typically by a protection circuit comprising an arrangement of resistor(s) and/or diode(s) connected across the terminals of each section of at least some sections of the magnet. The superconducting switch, conventionally provided as part of a superconducting magnet circuit, is also similarly protected. These types of magnets are typically energised with power supplies usually rated to a few hundred amperes and with relatively low compliance voltage usually of order 10V.

As illustrated in FIG. 1, a superconducting magnet 1 typically carries a superconducting switch 3 in parallel. During energisation the switch 3 is put in a resistive mode using a heater incorporated within the switch (not shown) so that the magnet 1 can be energised to a set current by application of a current of increasing magnitude from a power supply 4. The relatively large resistance of the switch 3 in the resistive mode limits the current through the switch and virtually all of the current goes straight into the magnet 1. Once the required magnet operating current is reached, the switch heater is turned off, and the superconducting switch 3 returns to a superconducting state. The current in the current leads is reduced until it reaches zero. Current flowing in the magnet 1 circulates now in the superconducting loop formed by switch 3 and magnet 1. Once the current in the current leads is decreased to zero, the power supply 4 can now be switched off and completely removed.

As is well known in the art, superconducting magnets are susceptible to quench events. In such events, for one reason or another, a part of the magnet ceases to be superconducting. For example, this may occur due to local heating, caused by movement of a small length of wire or events related to the coil structural integrity. The part which ceases to be superconducting becomes resistive. The current which is flowing through the magnet causes heating of this resistive part, which in turn heats more of the superconducting wire turning it restive and so the heat propagates through the rest of the magnet. The effect of this is that the energy which had been stored in the magnet is dissipated as heat in the wire of the magnet coils. In addition, the resultant drop in the current through the inductance of the magnet causes high voltages to be generated at the terminals of the magnet. During a quench, the current, voltage, and temperature all rise. These could get so high that poorly protected magnets (and switches) are known to be susceptible to damage. Protection circuits are therefore typically provided to contain and manage quenches.

Known superconducting magnets, for example those intended for MRI, NMR imaging, Particle Accelerators, and Research Physics are typically built with several coils and sections within coils. Two principal strategies for quench protection are typically employed. Firstly, a single protection circuit may be envisaged to provide protection for the entire magnet. Such a circuit is typically provided with a single protection resistor, or network of resistors, internal or external to a cryostat housing the superconducting magnet. Alternatively, protection circuitry is arranged using a network of resistors and/or diodes to protect individual coils or sections of coil within the magnet and/or the switch. This second arrangement is the one intended for improvement by United States patent application US20030057942. The use of individual protection resistors usually means that the protection resistors are within the cryostat—although these could be located outside the cryostat—while arrangements using a single resistor typically locate that resistor outside the cryostat—although correspondingly, the single resistor could be located within the cryostat. Such an external protection resistor adds the problem of passing electrical conductors out of the cryostat, but has the advantage that any heat dissipated by the resistor during a quench does not consume cryogen or introduce heat into the cryostat.

During a quench, the superconducting switch is driven normal or resistive by processes familiar to those skilled in the art, and the remaining current is driven through the switch's protection circuit, thereby dissipating the energy stored in the magnetic field.

In the case where the whole magnet is protected using a single resistor across its terminals and given that superconducting magnets are run with persistent currents of a few hundred amperes, it follows that a very high voltage, possibly in the order of kilovolts, could appear across the terminals of the magnet, and so also across the combination of the switch 3 and the resistor 5 used in the stabilization circuit. Superconducting switches are not typically designed to withstand such high voltages, and would thus be destroyed. Protection circuitry is typically provided as part of the superconducting switch to avoid destruction of the superconducting element. Such protection circuitry may take the form of a parallel circuit of diodes and/or resistors across the switch itself. Nevertheless, superconducting switches are only capable of withstanding voltages of some tens of volts.

The superconducting switch 3 is typically limited in how much current it can carry, usually a few hundred amperes, and how much voltage it could tolerate across it, usually just a few tens of volts. The superconducting switch 3 is usually protected with diodes and/or resistors. The protection across the switch is typically in a ratio of, for example, tens to hundreds to 1 so that during a quench, when the switch turns resistive, then most of the current will go through the quench protection circuit. It follows that the current flowing through the switch during a quench is very small, and thus keeping the heat dissipated through it to a minimum. If the switch is not adequately protected then it would burn and the magnet and/or the switch would have to be repaired or replaced.

With reference to FIGS. 1 and 2, United States patent application US20030057942 describes a method and arrangement for stabilising field decay in a superconducting magnet. Previously, superconducting magnets were energised during ramp-up, and then short-circuited by a superconducting switch once the current flowing in the magnet had reached a desired value. In US20030057942, a resistor 5 is added in series with the superconducting switch 3, and the current raised slightly above the nominal operating current as illustrated in the procedure shown in FIG. 2. This enables the algebraic sum of the voltages in the circuit defined by the magnet, switch and resistor to be adjusted to, or close to, zero which is the condition required for zero magnetic field drift. The protection resistors are not shown in FIGS. 1 and 2, but this solution is particularly applicable to magnets having separate protection circuits for the various sections of the magnet.

In particular, United States patent application US20030057942 describes a superconducting magnet assembly comprising a superconducting magnet 1 which, under working conditions, generates a magnetic field in a working volume, the superconducting magnet being connected in parallel with a superconducting switch 3, the switch and magnet being adapted to be connected in parallel to a power source 4 whereby under working conditions with the switch 3 open (i.e. in resistive mode), the magnet can be energised by the power source to generate a desired magnetic field in the working volume, following which the switch 3 is closed (i.e. allowed to return to superconducting mode). In particular, the assembly further comprises a resistor 5 connected in series with the switch 3, the resistor 5 and switch 3 together being connected in parallel to each of the magnet 1 and the power source 4. The resistor 5 may have a resistance in the range 1-1000 times the resistance of the magnet which is represented schematically by resistance 2 in FIG. 1, preferably 10-100 times. The power source 4, magnet 1 and resistance 5 may be arranged such that, in use, the instability in the generated magnetic field is less than 10 ppm/hour, but more preferably less than 0.01 ppm/hour.

United States patent application US20030057942 also describes a method of energising such a superconducting magnet assembly, the method comprising
i) energising the magnet 1 from the power source 4 with the switch 3 open;
ii) closing the switch 3; and
iii) changing the current supply from the power source 4 so as to reduce drift in the magnetic field generated in the working volume.

The method may further comprise the step iv) monitoring the magnetic field decay; and, repeating steps iii)-iv) with a different change in current in step iii) to reduce the magnetic field decay.

The teaching of United States patent application US20030057942 is largely reproduced below, in order to provide a more complete background to the present invention.

There are many applications in which superconducting magnets are used to create a stable magnetic field in a working volume. Examples include MRI, NMR, ICR and cyclotrons, in which the magnet is operated in the so-called "persistent mode". This involves connecting a near zero ohm connection between the start and end of a magnet once it has been energised. The techniques for achieving this are well known. The resulting field stability is then determined by the time constant of the magnet inductance and the total circuit resistance.

The time constant is defined as L/R where L is the magnet inductance in Henries, R is the total circuit resistance in Ohms, and the time constant is measured in Seconds.

So unless $L=\infty$ or $R=0\Omega$ then the resulting time constant will be finite, resulting in an exponential decay of both magnet current and field with time.

Depending upon the application, it is desirable to have the decay rate as close to zero as possible; typically, NMR application would like the decay rate to be less than 0.01 ppm/hour.

For most systems the magnet inductance is fixed by the geometry required to produce the very high homogeneous field and operating current required. So, in practice, the circuit resistance of the magnet will determine the field decay rate.

Previously, this field drift had been an accepted problem and the only solution has been to reenergise the magnet.

The problems outlined above in connection with magnetic field drift are overcome by adding a resistor in series with the switch. This enables the algebraic sum of the voltages in the circuit defined by the magnet, switch and resistor to be adjusted to, or close to, zero which is the condition required for zero magnetic field drift.

In contrast to conventional systems in which the power supplied to the magnet circuit is reduced to zero once the switch has been closed, the power supply must remain connected but it is believed that the benefit of achieving substantially longer periods of stable magnetic field outweigh the cost of maintaining the power supply.

Typically, the resistor has a resistance which is at least 10-100 times larger than the resistance of the magnet although a resistance in the range 1-1000 of the magnet resistance is possible. In addition, the resistor should have substantially no inductance.

There are various methods by which the correct current to achieve zero magnetic field drift can be determined.

In the first method, the resistance of the magnet can be determined. This can conveniently be achieved by providing a second superconducting switch in parallel with the magnet and power supply, the second switch being closed once the magnet has been powered up to a required field strength; and then monitoring the magnetic field decay so as to obtain a value for the magnet resistance. The decay rate=1/time constant and the time constant also is L/R (where L is the magnet inductance and R the magnet resistance). So the magnet resistance R=decay rate (in ppm/second) multiplied by the magnet inductance L. For example, if L=100H and the decay rate=3.6 ppm/hour then $3.6 \times 10^{-6}/3600=10^{-9}$ seconds the inductance L=100H gives $R=10^{-7}$ Ohms.

In a second approach, a voltmeter could be mounted across the magnet and the resistance determined directly in response to the passage of a known current.

In a third approach, the method further comprises:

iv) monitoring the magnetic field decay; and, repeating steps iii-iv with a different change in current in step iii to reduce the magnetic field decay. This iterative technique avoids the need for additional components.

The magnet may have any conventional construction utilizing either or both of low temperature and high temperature superconducting materials or other materials with low bulk resistivity. Since the power supply remains connected to the magnet, high temperature superconducting current leads are preferred to reduce heat conduction and minimise heat losses in the environment.

As shown in FIG. 1, the assembly comprises a superconducting magnet 1 of conventional form, the resistance of the magnet $R_1$ being shown separately at 2. The magnet is connected in parallel with a superconducting switch 3 and a power supply 4. The components described so far are conventional. In such a conventional system, the switch 3 is initially open and the magnet 1 is powered up by the power supply 4 until it generates the required magnetic field in the working volume. The superconducting switch 3 is then closed although no current begins to flow through this switch 3 until the power supply 4 is gradually deactivated. This deactivation causes current to flow in "persistent mode" through the series circuit formed by the magnet 1 (including the resistance $R_1$) and the switch 3. As explained above, however, due to the inherent resistance 2 ($R_1$) of the magnet 1, the magnetic field generated by the magnetic 1 in a working volume will gradually drift or decay.

This is overcome in the present invention by inserting an additional resistor 5 ($R_2$) in series with the superconducting switch 3.

Referring now to FIG. 2, with the switch 3 open, the magnet 1 is energised to the normal operating current I (step 10), the switch 3 is then closed (step 11) and then the current is further increased by $\Delta I$ (step 12) to the point where the additional current through the resistor 5 in series with the switch 3 generates an equal but opposite polarity voltage to exactly cancel the resistive voltage generated internally within the magnet 1 i.e. the algebraic sum of the circuit voltages is zero.

It should be understood that the increased power supply current does not flow through the magnet 1 (with the switch 3 closed) but only through the switch 3 and the resistor 5. This is because once the switch 3 has been closed the change in current in the power supply will divide and flow through both the switch circuit and the magnet circuit. The ratio between the two currents will be determined by the inverse ratio of the circuit inductances. As the magnet has a very large inductance (typically 100 H) and the switch inductance is very small (typically 100 nanoHenries), the current ratio is $10^{-9}$, so for all practical considerations all the power supply current change flows in the switch circuit. It should also be remembered that here, unlike in the persistent mode, during the operation of the magnet 1, the power supply unit 4 remains connected and supplies the current I+$\Delta I$ to the circuit.

The desired condition for magnetic field stability is when the voltage drops across the magnet and the resistor 5 are equal and opposite around the magnet-switch loop, that is:

$$I \cdot R(\text{Magnet}) = \Delta I \cdot R(\text{of resistor 5}) \qquad [1]$$

Small variations in the power supply are filtered by the time constant of the circuit resistance and magnet inductance such that the resulting time varying field rate can be several orders of magnitude lower than would be the case as determined by the time constant of the magnet operated in the "persistent mode" or directly energised by the power supply alone.

Typical values might be:
Magnet inductance=100 Henries.
Magnet resistance=$10^{-7}\Omega$.
Resistor 5=$10^{-6}\Omega$.
I Power Supply=100 Amperes.
$\Delta I$ over current=10 Amperes.

The magnet operated in the normal "persistent mode" will demonstrate a time constant of $10^{-9}$ seconds or a decay rate of 3.6 ppm/hour.

The same magnet operated in the "quasi-persistent" mode, that is using the resistor 5 as described above, will show a field stability of $3.6\times10^{-4}$ ppm/hr for a power supply variation of $10^{-5}$ and a field stability of $3.6\times10^{-3}$ ppm/hr for a power supply variation of $10^{-4}$. It is therefore the instability in the power supply current that governs the field stability in this latter mode. Incidentally, if the power supply remained connected in the persistent mode, then it will be appreciated that a much larger field instability would be produced compared with the quasi-persistent mode, as the time constant of the circuit would be smaller.

In order to arrive at the desired zero decay condition, it is necessary to set the current change $\Delta I$ correctly. There are various ways in which this could be achieved.

In the first approach, an additional superconducting switch 6 could be connected in parallel with the switch 3 and resistor 5. Initially, the power supply 4 is activated to power up the magnet 1 to the desired field strength, the switch 6 is closed and the power supply deactivated. The magnetic field decay is then monitored (step 13) using a, for example conventional, NMR technique and from this the magnet decay can be calculated by measuring the change of the NMR resonant frequency with time which is then used to determine the rate of change of field with time. Knowing the magnet inductance and the magnet operating current, the equivalent magnet resistive voltage can be calculated. The magnet resistive voltage is then divided by the value of the resistor 5 to give the value for the increased current $\Delta I$ from the power supply using equation [1] above. Switch 6 will then be opened and the process described above carried out with the precalculated additional current $\Delta I$ applied following closure of the switch 3.

In a second approach, a voltmeter (not shown) could be attached across the magnet 1 to determine its resistance 2.

In a third approach, a rough value for $\Delta I$ is supplied (step 12) and the field decay or drift measured in step 13. If that drift is too great (step 14) the power supply is increased and the process of steps 12 and 13 repeated. This set of steps can be iterated until the required field decay is achieved.

Of course, it is assumed in this case that an increase in current is necessary to achieve the required field decay or drift but it may be that a decrease in current is required and so step 12 would be adjusted accordingly.

The quasi-persistent mode will now be explained in greater detail.

Ordinarily according to the known method, in the persistent mode the decay in the magnet is dominated by the magnet resistor 2 ($R_1$) in series with the magnet. In this situation the voltage drop across the magnet inductor due to a change in the current within it, is equal to the voltage drop across the magnet resistance 2, that is:

$$L\frac{\Delta I}{\Delta t} = R_1 \cdot I_1 \qquad [2]$$

with L being the magnet inductance, $I_1$ the current flowing through the magnet and $R_1$ the magnet resistance 2.

It follows therefore that, for a particular magnet, as the NMR proton frequency is proportional to the current in the magnet, the decay $\Delta f$ in the magnet's operational proton frequency f is given by:

$$\Delta f = \frac{\Delta t \cdot R_1 \cdot f}{L} \qquad [3]$$

For example with frequency f=400 MHz magnet, L=58 Henries and a nominal $R_1$=4 μΩ, this would give a theoretical rate in the frequency of about 100,000 PHz/hour ("PHz/hour" denoting a decay in the proton resonant frequency).

In contrast to the above, according to the quasi-persistent mode, the current power supply 4 remains connected to the magnet and the switch 3 is closed such that current flows through both the magnet 1 and, in parallel, through the switch 3 and resistor 5. Since the power supply remains connected, it supplies a direct current, $I_2^o$, through the resistor 5 (having a resistance $R_2$), in addition to the direct current $I_1^o$ flowing through the magnet resistance 3 (here having a resistance value denoted $R_1$). In the static mode, the voltage generated across $R_2$ should be the same as that across the magnet resistor $R_1$. Therefore due to the voltages being equal:

$$I_2^o = \frac{R_1}{R_2} I_1^o \qquad [4]$$

Any change $\delta I_2$ within the current $I_2(t)(=I_2^o + \delta I_2)$ in the switch 3 and resistor 5 will be accompanied or balanced by a time varying change $\delta I_1$ in the current $I_1(t)(=I_1^o + \delta I_1)$. The power supply is kept operational and therefore the deciding factor in determining the decay rate is the stability of the power supply. To consider this further, small mathematical notation is now adopted.

As a result of a small change in current from the slight instability of the power supply 4, by a voltage balance calculation:

$$L\frac{\delta I_1}{\delta t} + R_1 \cdot (I_1^o + \delta I_1) = R_2 \cdot (I_2^o + \delta I_2) \qquad [5]$$
$$= L\frac{\delta I_1}{\delta t} + R_2 \cdot I_2^o + R_1 \cdot \delta I_1$$

A cancellation of terms gives:

$$L\frac{\delta I_1}{\delta t} + R_1 \cdot \delta I_1 = R_2 \cdot \delta I_2 \qquad [6]$$

And also, as the total current I is $I_1+I_2$, the total change in the current is:

$$\delta I = \delta I_1 + \delta I_2 \qquad [7]$$

Substituting $\delta I_2 = \delta I - \delta I_1$, this leads to:

$$L\frac{\delta I_1}{\delta t} + R_1 \cdot \delta I_1 = R_2 \cdot (\delta I - \delta I_1) \qquad [8]$$

Re-arranging terms:

$$\delta I_1 = \delta I \frac{R_2}{\left(\frac{L}{\delta t}\right) + (R_1 + R_2)} \qquad [9]$$

The importance of the stability of the current supply becomes paramount. For a power supply with a current stability of 10 ppm/hour, the change $\delta I_1$ is reduced to $3.6 \times 10^{-4}$ ppm/hour. For times $\delta t \ll L/(R_1+R_2)$, $\delta I_1$ is given by:

$$\frac{\delta I_1}{\delta t} = \frac{\delta I}{L/R_2} \qquad [10]$$

To test the above analysis, an experimental superconducting magnet of near zero resistance and having an inductance of 57.52 Henries was deliberately placed in series with a finite nominal resistance $R_1$ of 4 μΩ. The decay rate was measured under working conditions both in the persistent and quasi-persistent modes.

In the persistent mode the magnet was operated using a current of 95.5 A at a proton frequency of 400.419 MHz, generating a voltage drop across the 4 μΩ resistor of 0.382 mV. The resulting decay rate was measured as 111,000 PHz/hour.

In the quasi-persistent mode a 90 μΩ resistor (resistor 5 in FIG. 2) was placed in parallel with the magnet (and therefore in series with the switch 3). An increased current of 99.256 A was used to take account of the parallel resistor 2. This produced a measured decay rate of +49 PHz/hour, indicating that the current was slightly larger than optimum and as a result the proton frequency actually moved upwards. However, it can be seen that the overall rate of change in the proton frequency was substantially reduced. An improved value can therefore be achieved by the use of a slightly smaller current of 99.254 A. This result demonstrates that the 0.01 ppm/hour decay rate (described earlier) is achievable with the present invention, even with a high magnet resistance of 4 μΩ.

Using the equations above, to generate a 0.382 mV voltage across a 90 μΩ resistor requires a current of 4.24 A giving a total current of 99.7 A.

Assuming a drift in the power supply current of 10 ppm/hour, for a current of 99.7 A (that is for approximate current for 400 MHz operation) the expected instability in the current supply is about 1 mA/hour.

Using $\delta I/\delta t$=1 mA/hour with $R_2$=90 μΩ, this gives a rate of change of current in the magnet of $\delta I/\delta t = 5.6 \times 10^{-6}$ A/hour.

This equates to a calculated decay rate of 23 PHz/hour.

It can be seen therefore that the provision of the parallel resistance $R_2$ and the use of the power supply during the operation of the magnet can substantially improve the field stability.

As a further test using the experimental magnet system, the current was reduced by 2 mA to simulate a change in the power supply current. No corresponding step evidence of this change was found in the decay trace, only a small change of 34 PHz/hour in the decay slope and this result is consistent with the large time constant of the magnet circuit.

In some superconducting magnets, the resistance of the magnet itself ($R_1$) is very small, for example $10^{-10}$ Ω to $10^{-13}$ Ω thereby producing very long time constants for the magnet circuit in the persistent mode. However, other superconducting magnets have higher resistance values. One particular example of these is high temperature superconductors which often have a "finite" resistance and therefore such magnets are susceptible to greater instability in their magnetic fields. Fabrication processes can also cause increases in the resistance of the more traditional low temperature superconducting materials. It is for these types of magnets, having finite resistance values, that the invention is particularly suited since the time constants of the magnet circuits can be substantially reduced.

Having set out above the prior art as published in US20030057942, the present invention will now be described.

The solution set out in United States patent application US20030057942 suffers from at least the following potential drawbacks. The present invention aims to provide an improved superconducting magnet current stabilization circuit, in an aim to alleviate one or more of these drawbacks.

The solution set out in United States patent application US20030057942 is suitable for application to magnets having separate protection circuits for the various sections of the magnet, but is not applicable to magnets protected by a single protection circuit. The described arrangement for alleviating drift in a magnet only works if the voltage across the switch 3 and stability resistor 5 is less than tens of volts otherwise the excessive heating and current would destroy the switch 3. Such an arrangement is susceptible to damage in the case of a quench, as will now be described.

Consider the case of a superconducting magnet 1 which is energised to 1000 A, and has, for example, a 2 Ω parallel protection resistor across the associated switch 3. During a quench, current of about 1000 A would begin to flow through the 2 Ω resistor, and this would generate a voltage of about 2 kV across a magnet 1 and across the switch 3. Clearly, it would not be possible to use such switches and protection resistors on such a magnet, because the voltage and thus the heating power are very large. The resistance of a superconducting switch 3 in a resistive mode could be anything from a few ohms to a few hundred ohms.

Superconducting Fault Current Limiters (SFCLs), conventional in themselves, are used in the power distribution industry to prevent damage to distribution networks by excess currents flowing, for example, due to short circuits. Several different types of SFCLs are known such as resistive, inductive and rectifier types. A comparison of such types was published in *Journal of Physics: Conference series* 43 (2006) 909-912, A. Morandi et al. As is known, superconductors have zero electrical resistance when operated within certain limits of temperature, magnetic field, and current density. Should any of these quantities exceed a certain value, different for each superconducting material, the superconductor will revert to a "normal", resistive, state. SFCLs of the various types use this characteristic to provide current-limiting devices capable of handling hundreds of amperes of current at kilovolt potentials. Some types of SFCLs react to an excess current, magnetic field or temperature by limiting the electric current through the device to a present level. Other types react by reducing the current to a relatively low, or zero, level.

The above, and further, objects, characteristics and advantages of the present invention will become more apparent from the following description of certain embodiments, given by way of examples only, in conjunction with the accompanying drawings, wherein.

The prior art solution described may be applied to arrangements where a magnet is either small, or is made up of a number of circuits each protected by a protection resistor. In the case where a whole magnet is only protected with one resistor, usually external to the cryostat but could also be internal to the cryostat, then the solution of the prior art is no longer sufficient, for at least the following reasons. During a spontaneous quench of a superconducting magnet, several kilovolts would be generated across the start and end of the magnet coils. A conventional superconducting switch such as used on superconducting magnets (for example MRI magnets) is not built to withstand such extreme conditions.

The present invention addresses this difficulty by providing a stabilising circuit applicable in such circumstances. In particular, the stabilising circuit of the present invention employs a Superconducting Fault Current Limiter which cuts off above a certain level of current. This may occur by limitation of the current to a certain maximum value, or by reducing the current to a lesser value, which may be zero.

The present invention provides a current stability circuit for a superconducting magnet which in some ways resembles the arrangements of United States patent application US20030057942, but which is less susceptible to damage during a quench event, and which may be applied to superconducting magnets provided with a single protection circuit.

Figure 3:
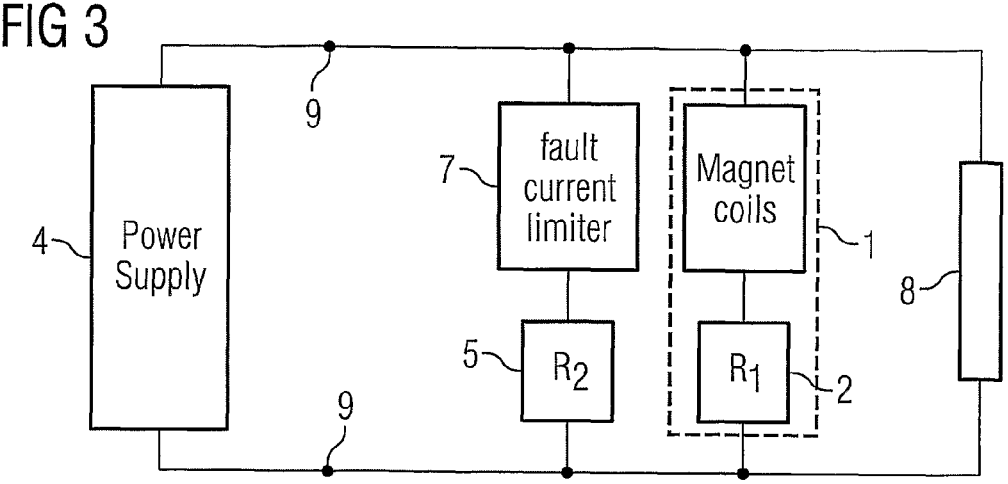
FIG. 3 shows a schematic block diagram of apparatus according to an embodiment of the present invention.

A circuit according to an embodiment of the present invention is illustrated in FIG. 3. The present invention proposes a stabilization circuit for reducing or eliminating current drift in a superconducting magnet, by providing a superconducting fault current limiter 7, in series with a stabilization resistor 5, in parallel with the protected magnet 1, which itself comprises magnet coils and resistance 2. Connection means 9 are provided, whereby magnet 1, connected in parallel with the series combination of superconducting fault current limiter 7 and stabilization resistor 5, may be further connected in parallel with a DC power source 4.

Figure 1:
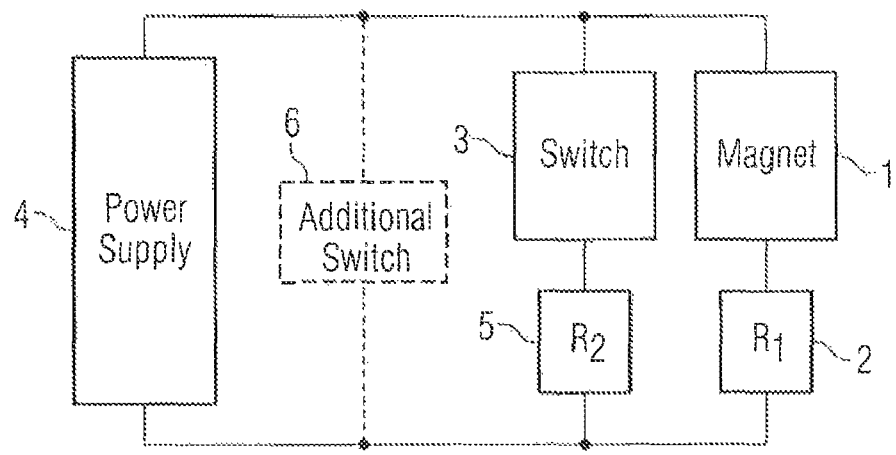
FIG. 1 is a schematic block diagram of the apparatus described in United States patent application US20030057942.
Figure 2:
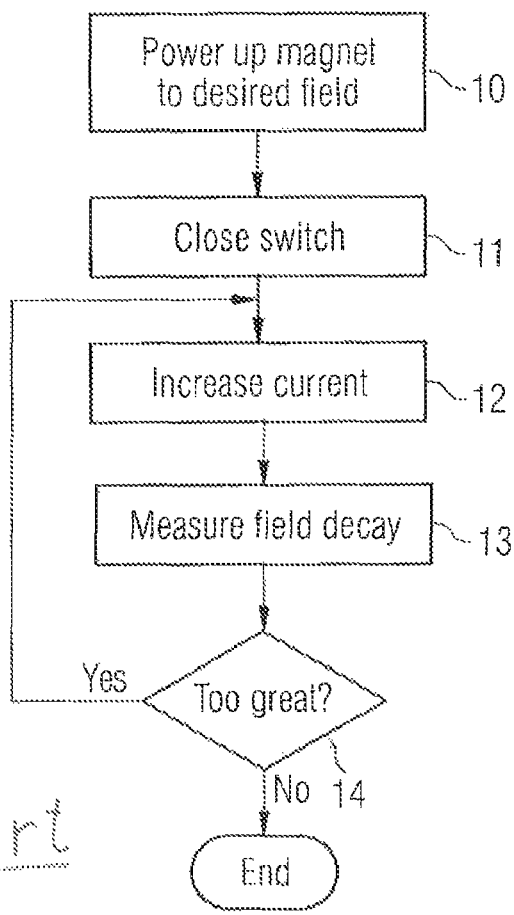
FIG. 2 is a flow diagram illustrating an example of the method described in United States patent application US20030057942.

Essentially, the superconducting fault current limiter 7 takes the place of the switch 3 of the prior art United States patent application US20030057942 (FIG. 1). However, in the case of a quench, the superconducting fault current limiter 7 is strong enough to withstand high currents and voltages it is subjected to, and under conditions of extreme loads, changes its characteristics to divert current flowing in the magnet 1 through protection resistor 8, where energy stored in the magnet is dissipated. A superconducting fault current limiter is a device that can bear applied voltages and currents far in excess of the limiting values for superconducting switches. For example, known superconducting current fault limiters can withstand thousands of amperes and kilovolts without damage.

They serve to limit the current flowing through them, once that current has reached a sufficiently high value to render included superconductor resistive, due to excess current density, excess magnetic field or excess temperature. The circuit of FIG. 3 illustrates a protection circuit in the form of a protection resistor 8 which, for example, could be located externally to the cryostat. This may be embodied by a single resistor, or an array of multiple resistors. These are preferably located external to the cryostat to minimise cryogen boil-off or keep the temperature of cryogen free cryostats to a minimum. The protection resistor 8 provides a single protection arrangement for the whole magnet 1.

Both the switch 3 of the prior art and the superconducting fault current limiter 7 of the present invention are superconducting devices. They each work on the principle that their resistances are zero in the superconducting state and then when the critical current or temperature is exceeded then they exhibit large resistances. The principle differences between the two devices are that the superconducting fault current limiter is more tolerant of high currents and voltages, and thus appears more robust.

A superconducting fault current limiter is a component, known in itself, typically used for detecting and isolating faults in power distribution circuits. It operates in the following way. A superconducting wire is cooled to a temperature at which superconductivity is possible. During normal operating conditions, a current below the critical current density flows through the superconducting wire and through associated circuitry. The critical current density is a current density value which, when caused to flow through the superconducting wire, will cause it to cease superconducting, and return to a normal, resistive, mode, regardless of its temperature. During fault conditions (in the present context, a quench event), an over-current is caused to flow through the superconducting wire of the superconducting fault current limiter. The superconducting fault current limiter is arranged such that this over-current is in excess of the critical current density. The over-current will cause the superconducting wire to cease being superconducting, and to become resistive. The superconductive wire, and any conductive cladding applied to the superconductive wire, is arranged such that its impedance is sufficiently high to limit the current flowing through it to a level which is safe for the associated circuitry. A parallel, resistive, conduction path may be provided to carry a portion of the current in this state. In the present context, such parallel resistive path is provided at least by protection resistor 8. Typically, the superconducting fault current limiter remains in its high impendence condition while current flows through it, as its impedance ensures that it is maintained at a temperature in excess of its critical temperature. When current flow ceases, typically due to a circuit being turned off following intervention of a service engineer, or a reset circuit operating, the superconducting fault current limiter is cooled back to a temperature at which superconductivity is possible, and the superconducting fault current limiter is ready to operate in its normal state again.

Such operation is typically employed in power distribution systems to avoid excess current flowing in fault conditions, for example as described in Canadian patent CA2070322 and in *Journal of Physics: Conference series* 43 (2006) 909-912, A. Morandi et al.

The present invention employs such superconducting fault current limiter in a new application, that is, in maintaining the stability of the magnetic field strength in a superconducting magnet.

Superconducting fault current limiters (SFCL) as envisaged by the present invention may be made from any type of superconducting material: HTS, $MgB_2$, or LTS. HTS is preferred since this would enable the SFCL to be placed in a high temperature region where it would not dissipate too much cryogen and yet cut off at a lower current. The FCL could be independently cooled by a cryocooler so that it cuts off fairly rapidly.

FIG. 3 schematically illustrates an embodiment of the invention. In a preferred embodiment of the present invention, a high-power protection resistor 8 is placed preferably externally to the cryostat which contains the superconducting magnet, with cables connecting to the magnet and a superconducting fault current limiter within the cryostat. It is also possible to place the external resistor in a separate compartment or internally inside the magnet cryostat. The protection resistor is preferably cooled, for example air or water cooled or other refrigerant, to provide effective dissipation of energy from the magnet.

In the context of a typical DC-operated superconducting magnet, a series superconducting fault current limiter 7, used in place of the switch in the resistor stabilization solution of the prior art, would limit the current during a quench and divert it through the protection resistor 8.

Connection means 9 are provided to enable the connection and disconnection of a DC power supply in parallel with the magnet and the series combination of the superconducting fault current limiter 7 and resistor 5. Such connection means may, for example, comprise a plug, a socket, a terminal board, exposed electrical conductors, persistent (superconducting) joint, and so forth. DC power supply 4 will be connected to the connection means when the magnet is in use.

The present invention accordingly provides the use of a superconducting fault current limiter to achieve the persistence stability of the superconducting magnet and quench protection.

Figure 4:
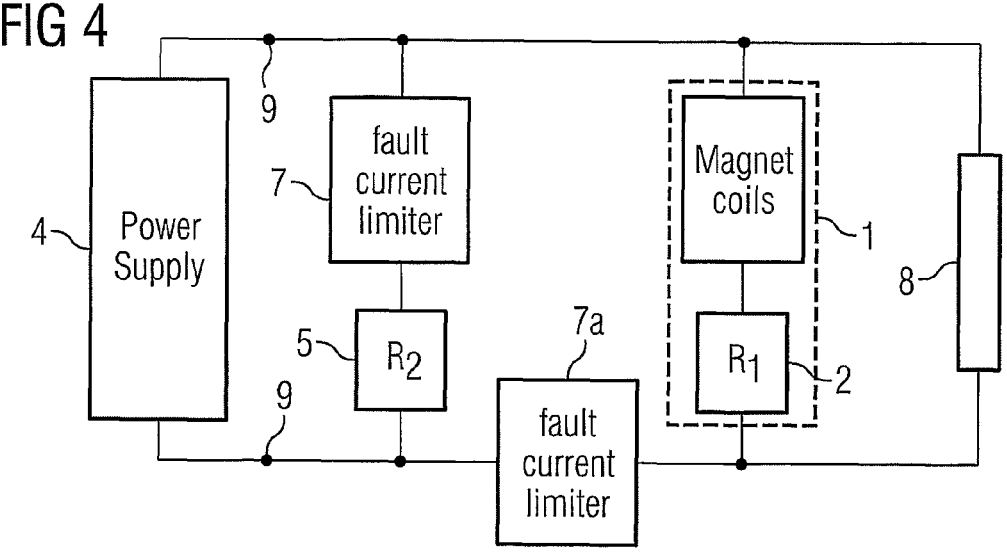
FIG. 4 shows a schematic block diagram of apparatus according to another embodiment of the present invention.

FIG. 4 shows an alternative embodiment of the present invention. According to this second embodiment, a further superconducting fault current limiter 7a is placed in series between the connection means 9 and the magnet 1. The use of such a superconducting fault current limiter 7a in series with the power supply 4 also serves to protect the power supply 4 and enable the energisation of the magnet with a standard 10V power supply since a quench in the magnet would lead to the further superconducting fault current limiter 7a essentially becoming open-circuit, so as to isolate the power supply 4 and leave only the protection resistor 8 connected to the magnet.

As illustrated, in this embodiment, further superconducting fault current limiter 7a is placed in series between the connection means 9 and the magnet 1. Preferably, the further superconducting fault current limiter 7a is placed in series between the magnet 1 and the series combination of the fault current limiter 7 and the resistor 5. The magnet 1, the further superconducting fault current limiter 7a, the fault current limiter 7 and the resistor 5, form a closed series circuit.

Figure 5:
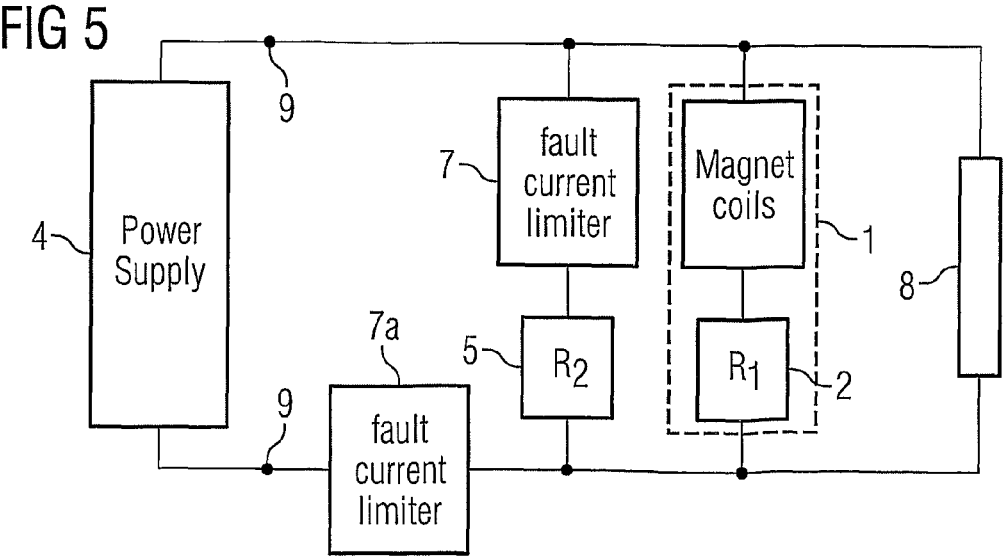
FIG. 5 shows a schematic block diagram of apparatus according to another embodiment of the present invention.

FIG. 5 shows a third embodiment of the present invention, which bears certain similarities to the embodiment of FIG. 4. According to this third embodiment, the further superconducting fault current limiter 7a of FIG. 4 is moved to a new position in series between the connection means 9 and the node connecting the magnet 1, the protection resistor 8 and the series combination of the fault current limiter 7 and the resistor 5. As with the embodiment of FIG. 4, the use of such further superconducting fault current limiter 7a in series with the power supply 4 also serves to protect the power supply 4 and enable the energisation of the magnet with a standard 10V power supply since a quench in the magnet would lead to the superconducting fault current limiters 7, 7a essentially becoming open-circuit, so as to isolate the power supply 4 and leave only the protection resistor 8 connected to the magnet.

As illustrated, in this embodiment, the power supply 4; the series combination of the fault current limiter 7 and the resistor 5; and the further superconducting fault current limiter 7a, form a closed series circuit.

The invention claimed is:
1. A superconducting magnet assembly comprising a superconducting magnet which, under working conditions, generates a magnetic field in a working volume, wherein:

the superconducting magnet under working conditions is connected in parallel with a series combination of a superconducting fault current limiter and a first resistor, and is further connected in parallel with a protection resistor; and the superconducting magnet assembly further comprises connection means for further connection of the magnet in parallel with a DC power source; whereby, under working conditions, the magnet is energized by such a power source to generate said magnetic field in the working volume; and under quench conditions, the superconducting fault current limiter becomes resistive and current flows through the protection resistor, to provide dissipation of energy from the magnet.

2. The superconducting magnet assembly according to claim 1, wherein a DC power source is connected to the connection means, in parallel with the magnet and in parallel with the series combination of the superconducting fault current limiter and the first resistor.

3. The superconducting magnet assembly according to claim 1, wherein the first resistor has a resistance in the range 1-1000 times the resistance of the magnet.

4. The superconducting magnet assembly according to claim 1, wherein the first resistor has a resistance in the range 10-100 times the resistance of the magnet.

5. The superconducting magnet assembly according to claim 1, wherein the power source, the magnet, the first resistor and the second resistor are arranged such that, in use, the instability in the generated magnetic field is less than substantially 10 ppm/hour.

* * * * *